Patented Dec. 15, 1953

2,662,900

UNITED STATES PATENT OFFICE 2,662,900

3-THIENYL THIOETHERS

John W. Brooks, Wenonah, and Sigmund J. Lukasiewicz, Woodbury, N. J., assignors to Socony-Vacuum Oil Company, Incorporated, New York, N. Y., a corporation of New York No Drawing. Original application November 22, 1948, Serial No. 61,524. Divided and this application June 1, 1951, Serial No. 229,536

5 Claims. (Cl. 260—329)

This invention relates to a group of new chemical compounds, namely, the 3-thienyl thioethers characterized by the formula:

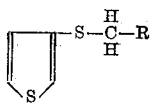

where R is a (3-thienylthio)-alkyl or (di-3-thienylthio)-alkyl group.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil varies with the type and degree of refinement to which the oil has been subjected and with the conditions under which it is used or tested. That is, the products formed in an oil fraction as a result of oxidation and the degree to which they are formed depend on the extent to which the various unstable constituents or constituents which may act as oxidation catalysts have been removed by refining operations and also upon the conditions of use.

The compounds of this invention greatly improve the oxidation characteristics of mineral oil fractions. It has been found that, by the addition of a 3-thienyl thioether having the above designated formula to a viscous mineral oil fraction, the development of undesirable products and properties, such as acid, sludge, discoloration, and corrosiveness toward alloy-bearing metals, normally encountered under conditions of use, has been substantially inhibited.

The present compounds are suitably prepared by the action of an appropriate organic halide on 3-thiophenethiol in the presence of an alkaline condensing agent such as alcoholic potassium hydroxide. The choice of organic halide reactant will be governed by the product desired. In general, a halogenated paraffin containing at least two halogen atoms, not more than one of which is attached to the same carbon atom, will be used. In preparation of 3-thienyl thioethers wherein R is a (3-thienylthio)-alkyl group, a halogenated paraffin containing two or more halogen atoms attached to different carbon atoms will be employed. In preparation of 3-thienyl thioethers where R is a (di-3-thienylthio)-alkyl group, a halogenated paraffin containing three or more halogen atoms attached to different carbon atoms will be employed. Typical of the organic halides employed in preparation of the instant compounds are ethylene chloride, 1,2,3-trichloropropane, and tetramethylene chloride. The above reaction will usually be carried out with a molar ratio of thiophenethiol to organic halide of between about 2 to 1 and about 4 to 1. Under the above described conditions, the hydrogen of the mercapto group in the 3-thiophenethiol is replaced by the radical

to yield the desired 3-thienyl thioether. The aforementioned reactant of 3-thiophenethiol may be prepared by the procedure described in Chem. Inds. 60, 593–5, 620 (1947) or by any other feasible method.

The nature of the organic substituent group present in the 3-thienyl thioethers described herein may be either a (mono-3-thienylthio)-alkyl group or a (di-3-thienylthio)-alkyl group. Representative of the compounds of this invention are 1,2-(di-3-thienylthio)-ethane; 1,2,3-(tri-3-thienylthio)-propane; 1,4-(di-3-thienylthio)-butane; and the like. This list, of course, is not to be construed as limiting since the present invention contemplates other 3-thienyl thioethers falling within the scope of the above designated formula. Those skilled in the art will readily recognize various other (3-thienylthio)-alkyl 3-thienyl thioethers and (di-3-thienylthio)-alkyl 3-thienyl thioethers which may be synthesized according to the above described procedures.

The preparation of the compounds of the present invention may be illustrated by the following examples, which are given by way of illustration and not intended to be a limitation on the scope of the invention.

EXAMPLE I

*Preparation of 1,2,3-(tri-3-thienylthio)-propane*

Seventy-five grams (0.5 mole) of 1,2,3-trichloropropane, 203 grams (1.75 moles) of 3-thiophenethiol, and 150 milliliters of ethyl alcohol were added to a flask. A solution of 98 grams of potassium hydroxide (1.75 moles) in 125 milliliters of water and 200 milliliters of ethyl alcohol was slowly added to the flask. The temperature was maintained at about 50° C. during this addition. At the end of this time, the resulting reaction mixture was diluted with water and extracted with ethyl ether. The ether solution was then topped to a pot temperature of 100° C. under one millimeter of mercury after first removing the ether at atmospheric pressure. The resulting product had a sulfur content of 41.8 per cent and a chlorine content of 9.26 per cent. This reaction was incomplete, so 85 grams of the reaction product were mixed with 50 grams of 3-thiophenethiol and 20 grams of potassium hydroxide in 200 milliliters of ethyl alcohol and heated to a temperature of 75° C. for a period of 2 hours. After washing with water, drying and topping off the ethyl alcohol, 1,2,3-(tri-3-thienylthio)-propane was obtained, having a sulfur content of 49.62 per cent, the theoretical sulfur content being 49.75 per cent. This compound is hereinafter referred to as Compound I.

EXAMPLE II

*Preparation of 1,2-(di-3-thienylthio)-ethane*

Four hundred six grams (3.5 moles) of 3-thiophenethiol were placed in a flask and 196 grams of potassium hydroxide (3.5 moles) in 450 cubic centimeters of ethyl alcohol and 200 cubic centimeters of water were added. Four hundred forty-nine grams (1.5 moles) of ethylene chloride were added at such a rate to maintain the temperature in the range of 45–50° C. After the addition was completed, the reaction mixture was stirred at 75° C. for 5 hours. The resulting reaction mixture was washed well with water and 375 grams of white solid formed, representing a yield of 97 per cent of 1,2-(di-3-thienylthio)-ethane, based on the weight of ethylene chloride. This material was recrystallized from cyclohexane and had a melting point of 54–55° C. and a sulfur content of 49.41 per cent, the theoretical sulfur content being 49.62 per cent. This compound is hereinafter referred to as Compound II.

EXAMPLE III

*Preparation of 1,4-(di-3-thienylthio)-butane*

Four hundred six grams (3.5 moles) of 3-thiophenethiol and 196 grams of potassium hydroxide in 200 cubic centimeters of water and 350 cubic centimeters of ethyl alcohol were added to a flask. One hundred ninety-one grams (1.5 moles) of tetramethylene chloride were added at such a rate that the temperature was maintained in the range of 45–50° C. After the addition was completed, the temperature of the mixture was raised to 75° C. and kept there for a period of 4 hours. The resulting reaction mixture was washed well with water to give white, flaky crystals of 1,4-(di-3-thienylthio)-butane in 87 per cent yield. This material was recrystallized from cyclohexane and had a melting point of 62–63° C. and a sulfur content of 44.05 per cent, the theoretical sulfur content being 44.62 per cent. This compound is hereinafter referred to as Compound III.

The compounds of this invention have been found to be valuable as additives in the stabilization of petroleum oil fractions, particularly in inhibiting the development of those undesirable products and properties such as acid, sludge, discoloration, and corrosiveness toward alloy-bearing metals normally encountered upon conditions of use. Thus, it is well known that motor oils, especially those refined by certain solvent-extraction methods, tend to oxidize when submitted to high temperatures and to form products that are corrosive to metal bearings. This corrosive action may be quite severe with certain bearings, such as those having the corrosion susceptibility of cadmium-silver alloys, and may cause their failure within a comparatively short time. The following test was used to determine the corrosive action of a motor oil on an automobile rod bearing.

The oil used consisted of Pennsylvania neutral and residuum stocks separately refined by means of chlorex and then blended to give an S. A. E. 20 motor oil with a specific gravity of 0.872, a flash point of 435° F. and a Saybolt Universal viscosity of about 318 seconds at 100° F. The oil was tested by adding a section of a bearing containing a cadmium-silver alloy surface and weighing about 6 grams, and heating it to 175° C. for 22 hours while a stream of air was bubbled against the surface of the bearing. The loss in weight of the bearing during this treatment measures the amount of corrosion that has taken place. A sample of the oil containing a stabilizing compound of this invention was run at the same time as a sample of the straight oil and the loss in weight of the bearing section in the inhibited oil can thus be compared directly with the loss in the uninhibited oil. The results obtained in this test employing minor proportions of the above described compounds as inhibitors are set forth in the following table:

| Compound Added | Concentration in Percent | Mg. Loss in Weight |
| --- | --- | --- |
| None | 0 | 20 |
| I | 0.25 | 0.01 |
|   | 1.00 | 0.01 |
| II | 0.25 | 2 |
|   | 0.5 | 0 |
| III | 0.12 | 7 |
|   | 0.25 | 0 |
|   | 0.5 | 0 |

A second test to which an oil containing a minor proportion of the compounds of this invention was subjected consisted essentially of passing oxygen through a 150-gram sample of oil at a rate of 2 liters per hour for a period of 70 hours at a temperature of 250° F. and measuring the neutralization number of the oil at the end of the test. In this test, the base oil containing no additive developed a neutralization number of about 20. The following data indicate that the compounds of this invention are effective in inhibiting the development of acidity in a mineral oil when the same is subjected to oxidation conditions as evidenced by the comparatively low neutralization number of such oils at the completion of the above test. In each of the oils tested, 0.1 per cent by weight of a compound of this invention was incorporated therein.

| Compound Added | Neutralization Number |
| --- | --- |
| None | 20 |
| I | 0.02 |
| II | 0.00 |
| III | 0.02 |

From the foregoing test results, it will be evident that the 3-thienyl thioethers of this invention are effective stabilizing agents for petroleum lubricating oil fractions. The quantity of compound employed as stabilizer to inhibit the undesirable effects of oxidation in the oil may be varied, depending upon the character of the oil and the severity of the conditions to which it is exposed. Ordinarily, the compositions will be added to mineral oil fractions in an amount ranging from about 0.1 to about 4 per cent, but may be added in amounts up to 10 per cent by weight in some instances.

This application is a division of co-pending application Serial Number 61,524, filed November 22, 1948, and issued as U. S. 2,577,566 on December 4, 1951, which, in turn, is a division of application Serial Number 791,652, filed December 13, 1947, and issued as U. S. 2,480,832, on September 6, 1949.

We claim:

1. As a new composition of matter, a 3-thienyl thioether characterized by the formula:

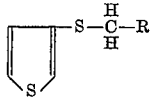

where R is a lower alkyl radical selected from the group consisting of (3-thienylthio)-alkyl and (di-3-thienylthio)-alkyl.

2. As a new composition of matter, (3-thienylthio)-alkyl 3-thienyl thioether, the alkyl radical of which is a lower alkyl.

3. As a new composition of matter, 1,2-(di-3-thienylthio)-ethane, characterized by the formula:

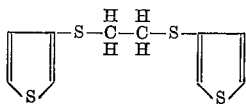

4. As a new composition of matter, 1,4-(di-3-thienylthio)-butane, characterized by the formula:

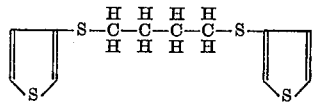

5. As a new composition of matter, 1,2,3-(tri-3-thienylthio)-propane, characterized by the formula:

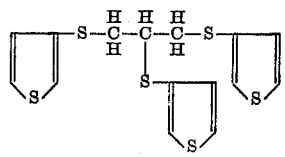

JOHN W. BROOKS.
SIGMUND J. LUKASIEWICZ.

References Cited in the file of this patent

Steinkopf, "Die Chemie Des Thiophens," pp. 100–101, Steinkopf, Dresden, 1941, Edwards Bros. Inc., Ann Arbor, Mich., 1944.